United States Patent [19]

Duthie

[11] Patent Number: 4,461,541

[45] Date of Patent: Jul. 24, 1984

[54] STEREOSCOPIC VIDEO IMAGE DISPLAY

[75] Inventor: Joseph G. M. Duthie, Huntsville, Ala.

[73] Assignee: The United States of America as represented by the Secretary of the Army, Washington, D.C.

[21] Appl. No.: 362,015

[22] Filed: Mar. 25, 1982

[51] Int. Cl.³ ............................ G02B 7/26; H04N 9/54
[52] U.S. Cl. ................................. 350/132; 350/162.12; 358/88
[58] Field of Search .................... 350/132, 130, 162.12; 358/88, 89, 91, 92

[56] References Cited

U.S. PATENT DOCUMENTS

| | | | |
|---|---|---|---|
| 3,700,902 | 10/1972 | Buchan | 350/162.12 |
| 3,744,879 | 7/1973 | Beard et al. | 350/162.12 |
| 3,912,386 | 10/1975 | Gorog et al. | 350/162.12 |
| 4,370,024 | 1/1983 | Task et al. | 350/162.12 |

FOREIGN PATENT DOCUMENTS 54-89714 12/1979 Japan ............................ 350/162.12

OTHER PUBLICATIONS

R. W. Lewis, "Real-Time Coherent Optical Edge Enhancement", *Applied Optics*, vol. 17, No. 2, pp. 161-162, Jan. 1978.
W. N. Charman, "Three-Dimensional TV System", Applied Optics, vol. 20, No. 1, Jan. 1, 1981, pp. 14-16.
T. H. Chao et al., "White-Light Psendocolor Density Encoding Through Contrast Reversal", Optics Letters, vol. 5, No. 6, Jun. 1980, pp. 230-232.
F. T. S. Yu et al., "Multi-Image Regeneration by White Light Processing", Optics Communications, vol. 34, No. 1, Jul. 1980, pp. 11-14.
J. G. Duthie et al., "Real-Time Optical Correlation with Solid-State Sources", SPIE, vol. 231, 1980 International Optical Computing Conference, (1980), pp. 281-290.

*Primary Examiner*—Jon W. Henry
*Attorney, Agent, or Firm*—Robert P. Gibson; Anthony T. Lane; Freddie M. Bush

[57] ABSTRACT

An image display system and method provides at least two separate and distinct images of a viewed scene for an observer. The images, taken from adjacent positions looking toward the target scene, are taken from relatively small, acute position angles with respect to the scene. These separate images are then encoded with different polarization in sequence for displaying on a television monitor. The images are prepared for viewing by an observer by focusing the monitored images onto a liquid crystal light valve. Collimated light from a coherent source addresses the light valve providing a coherent output therefrom with the encoded images thereon. These images are brought to a Fourier plane and polarized or filtered selectively to provide separately encoded images in alternate frames of polarization. An observer wearing separately polarized lens and viewing an output screen sees a stereoscopic view of the imaged scene.

6 Claims, 3 Drawing Figures

STEREOSCOPIC VIDEO IMAGE DISPLAY

DEDICATORY CLAUSE

The invention described herein may be manufactured, used, and licensed by or for the Government for governmental purposes without the payment to me of any royalties thereon.

BACKGROUND OF THE INVENTION

Optical data processing techniques can be used to encode and to decode or display composite images. For example, two or more images have been stored on a photographic plate with each image encoded by sequentially recording established transparencies of each image on fresh film. In so doing, a Ronchi grating can be used in two or more angular positions between a white light source and the transparency for encoding the photographic film. Thus a first recording may be exposed with the transparency at a reference 0 degree Ronchi grating position and a second recording may be exposed at a 90 degree Ronchi grating position. A multiplexed spatially encoded transparency can be obtained in this manner. For display, these images can be separated in the Fourier transform plane by placing a spatial filter in the plane which allows only the required spatial frequencies to be transmitted.

The traditional stereoprojection system uses a stereo camera and a stereoprojector. A pair of cameras may be held at a fixed separation and used to take stereoscopic pictures of an object or scene, the cameras shutters being operated simultaneously. When the prints or transparencies produced are viewed by the two eyes of an observer, a solid or three dimensional reproduction of the original scene is generated. By using a stereoprojector the two images of the scene are projected in polarized light onto a non-depolarizing screen, the vectors of polarization being at right angles in the two pictures while the viewing individuals are equipped with differently oriented polarizing filters so that the correct picture reaches each eye. A typical stereoprojection system is shown in FIG. 1 and comprises two independent systems 10 and 12 which are adjacent for projecting respective images to a screen 14. System 10 comprises a light source $S_1$, condenser $C_1$, a stereoscopic transparency of an input scene or object $O_1$, projection lens $L_1$ and a polarizer $N_1$ for projecting a polarized image of $O_1$ onto screen 14 from an acute angle with respect to system 12. System 12 is identical to system 10 and component parts are noted by the subscript 2 on the drawing. Polarizer $N_1$ is perpendicular to $N_2$ and images $O_1'$ and $O_2'$ are polarized images of the transparencies $O_1$ and $O_2$. Two cameras and two projectors are required in this system.

Prior art image regeneration is well established in the art and is also taught by Yu et al in Optics Communication, Volume 34, Number 1, July 1980, pages 11–14 and includes multi-image regeneration by superimposing a signal transparency with a highly efficient diffraction grating in the input plane of a white light optical processor. Typical of prior art encoding teachings is that of Chao et al in Optics Letters, Volume 5, Numbers 6, June 1980, pages 230–232. In Chao, a negative transparency of the object is available and is placed between a Ronchi grating and a fresh photographic film. The encoding is recorded on the new film. Subsequently a positive transparency of the object is processed in the same way with a different angular position of the grating, resulting in a multiplex spatially encoded transparency that is contrast-reversal.

As is not show, two separate television cameras may view the input scene to generate a stereo pair of images. However, since only a relatively small angle is necessary between viewing positions to create a stereoscopic or three dimensional image, for stationary or relatively slow moving focal objects such as a tank or crane, only one camera may be used. This is accomplished by angularly moving the camera within a plane between the shots, as for example back and forth with 64 millimeters between points where camera exposure of the film occurs. While two cameras and two films (or more) can be used, if only one film and one projector is used, the system is more simple, economical, and the need for characteristic matching of components is unnecessary. Once the photographic transparencies of the object are obtained they are processed as shown in FIG. 2 wherein a first transparency 20A is passed between a Ronchi grating 22A set at a reference 0 degree position and new photographic film 24A. Collimated white light is applied and the Ronchi grating is superimposed on the image to generate a series of dark lines on the pictures transferred to the new film. Subsequently either the grating 22A is rotated 90 degrees from the reference position or otherwise replaced by a grating 22B as shown and the film is advanced to the next frame 20B where new film frame 24 B is similarly encoded at a right angle to the first film.

SUMMARY OF THE INVENTION

In displaying stereoscopic video images which may be transmitted on standard video equipment, television equipment is used to display either stored images such as encoded film containing video images or real time images to allow a viewer to percieve depth in the images. Two or more stereoscopic images displayed on a single television monitor are separated by interposing linear polarizing elements in the Fourier tranform plane of an optical data processing system. The linear polarizers are placed in the plane to intercept the separately encoded or modulated carrier frequencies of the superposed stereoscopic input images. The input to the optical data processing system is a suitably encoded television image. Two video scenes from two separate sources are first encoded with superposed linear grids, the grids being in different, optimally orthogonal directions. These two video signals are then multiplexed such that alternate video frames consist of alternate images. This encoding procedure performs the same function as the use of Ronchi gratings in the prior art. This encoded image is coupled from the television monitor to the input side of a light valve. The output side of the light valve is addressed by light from a spatially coherent light source, and resultant coherent output images are directed to the Fourier transform plane for separation. Subsequently a viewer wearing glasses of linear polarizers will perceive a stero image.

DESCRIPTION OF THE PREFERRED EMBODIMENT

Figure 1:
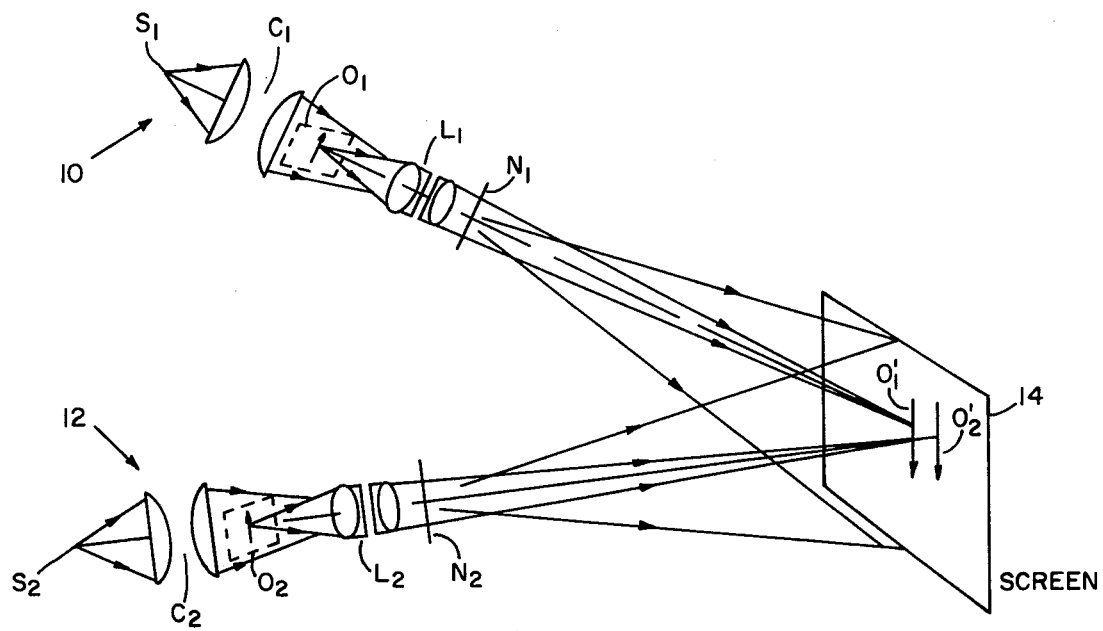
FIG. 1 is a schematic diagram of a conventional prior art stereoprojection system.
Figure 2:
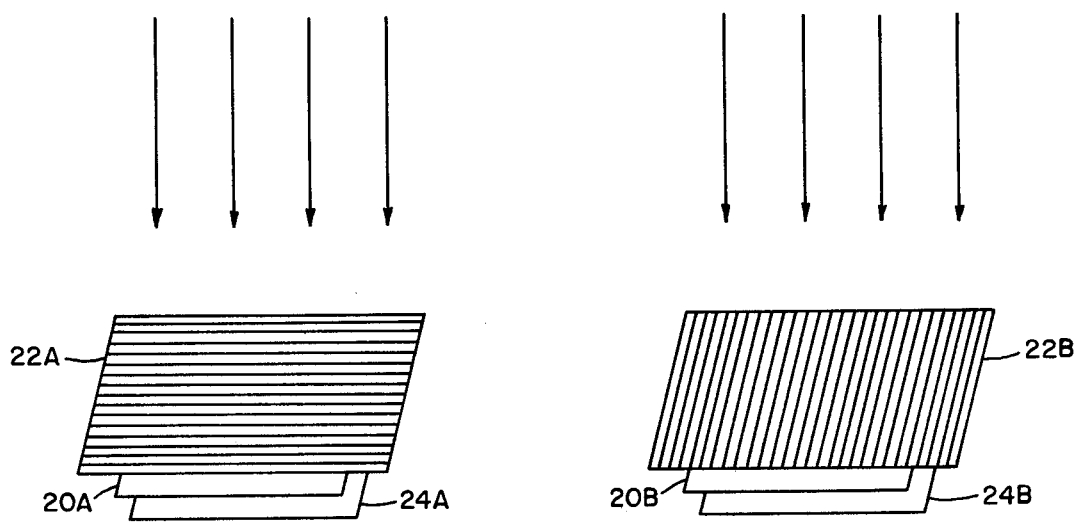
FIG. 2 is simplified schematic diagram of a conventional encoding process.
Figure 3:
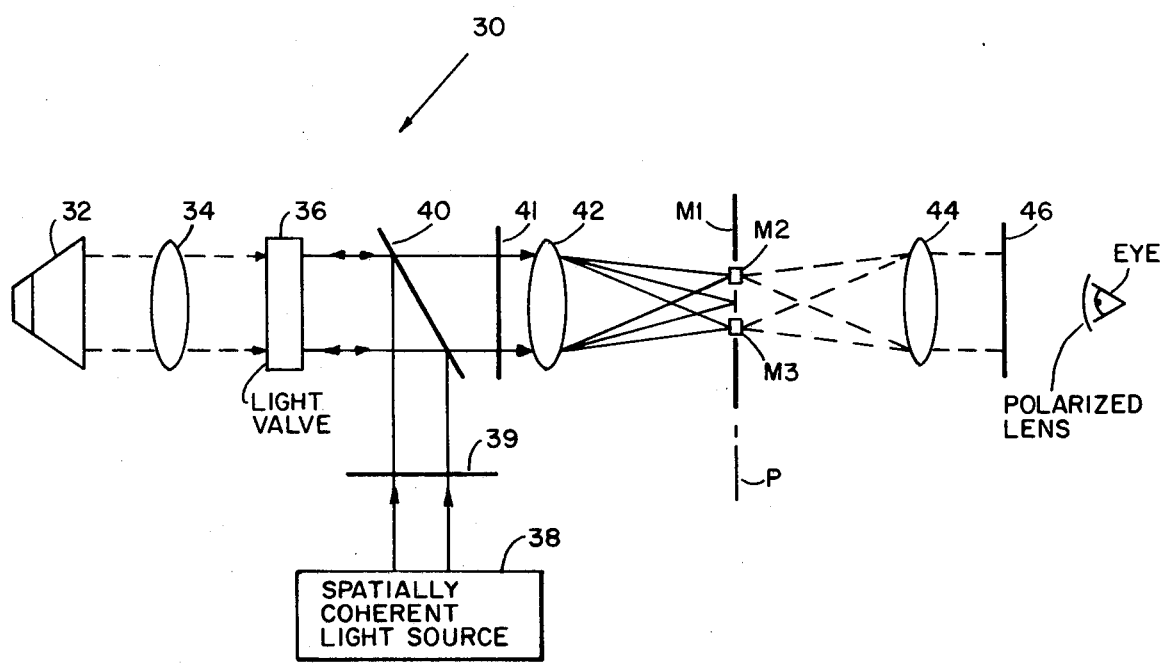
FIG. 3 is a schematic diagram of the optical data processing system.

Referring now to the drawing, FIG. 3 is a preferred embodiment of the optical data processing system. According to prior art procedures a scene is viewed with one or more cameras. The encoding procedure for television images provides two or more video images of a scene or object taken from slightly separate sources or directions. The resultant stereoscopically coupled images are subsequently encoded with superposed linear grids, with the grids encoding adjacent images in optimally orthogonal directions. Thus the input video signals are multiplexed so that adjacent television frames consist of source images taken from slightly different angles. By employing a high spatial frequency, close to the resolution of the television, the two video signals are combined either by addition or by interleaving alternate fields. There appears to be a resolution advantage if the superposed Ronchi pattern is superposed electronically at a frequency almost commensurate with the television video scan rate so that in time average the image resolution is not impared. Observer viewing of the data to achieve a stereoscopic effect requires the data or images to be separated and viewed by separate eyes. To accomplish separated viewing a optical data processing system 30 is shown in FIG. 3 wherein a television screen or monitor 32 images the particular frames. The conventional television monitor 32 is imaged by a transfer lens 34 onto the input side of a liquid crystal light valve 36 such as the hybrid field effect liquid crystal light valve produced by Hughes Aircraft Company. The photoactivated liquid crystal light valve can receive image inputs in real time from non-coherently illuminated scenes and convert these images to a coherent optical output. The incoherent input image is then converted into a coherent image by reading out the light valve. Reading out of the light valve is accomplished with a spatially coherent light source 38 and a beam splitter 40 by directing a collimated light beam from source 38 through linear polarizer 39 to beamsplitter 40 and thence to the output side of light valve 36. The output side is thereby addressed by a spatially coherent light source. This coherent beam, with the light valve output thereon, has superposed images of the particular left hand and right hand views, or angular position view, of the input scene, with each view being previously polarized or modulated by the electronically impressed grating. The beam is directed through beamsplitter 40 and a polarization analyzer 41 to the Fourier transform lens 42 which creates in the plane P a pattern which comprises a zero spatial frequency spot and different orders of diffraction of the gratings. A mask M1 is placed in the plane P and excludes all but the first order diffracted light of each grating. At the position in the mask M1 where these first orders occur, masks M2 and M3 polarize the beam transmitted through the two first orders in directions orthogonal to each other, yet at 45 degrees from the polarization transmitted by polarization Analyzer 41, which is an essential part of the light valve operation. Lens 44 then reimages the input scenes in orthogonal polarization onto screen 46. Viewing of the screen through polarized eyeglasses produces the stereo effect for an observer.

The Fourier transform optics decomposes the image. Polarizing the light and using polarized glasses admits only the appropriate field into each eye. The persistence of viewer vision combined with the separation of the two images in an optical image processor ensures depth perception.

An alternative method of generating the video image without the polarizers is by inserting suitable optics in the post mask region to feed the separate images into a binocular eyepiece. A disadvantage of this alternative is cumbersome viewing procedure, only one viewer at a time being able to see the image. However, in either case, the system adds a third dimension in apparent video display systems, which can significantly improve discernment and tracking of targets.

Although a particular embodiment of this invention has been illustrated, it is apparent that various modifications of the invention may be made by those skilled in the art without departing from the scope and spirit of the foregoing disclosure. Accordingly, the scope of the invention should be limited only by the claims appended hereto.

I claim:

1. A method of displaying encoded stereoscopic video images comprising the steps of:
    displaying encoded film containing video images on a television monitor;
    imaging the video images as an incoherent input onto a light valve;
    addressing the light valve output to provide coherent output images;
    polarizing the addressed light valve output;
    transforming the polarized output by Fourier transformation to create in a plane, a pattern having different orders of diffraction light containing said images;
    masking the plane with first and second masks disposed in a common plane to pass only selected of said diffraction light for sequentially passing alternate orthogonally polarized video images therethrough;
    reimaging the images onto a screen for viewing; and viewing of said reimaging image by an observer through polarized eyeglasses to produce a stereoscopic effect.

2. A method of displaying encoded stereoscopic video images as set forth in claim 1 and further comprising the steps of:
    addressing the light valve output by directing a collimated read out light to a beamsplitter at the output of said light valve; and
    directing said collimated read out light by said beamsplitter to the output of said light valve for combining with the output to provide said coherent images output.

3. Apparatus for displaying of encoded stereoscopic video images comprising: a television monitor for imaging a plurality of images sequentially from a video input, said plurality of images being input video signals that are multiplexed so that adjacent television frames are images of a common source taken from different angles, a light valve having an input and an output, the input of said light valve being disposed for receiving said images from said monitor, a Fourier transform lens, a beam splitter between the output of said valve and said Fourier transform lends for directing coherent images from said valve to said lens, a polarization analyzer disposed between the beam splitter and the Fourier transform lens, a spatially coherent light source for directing collimated light to said beam splitter for addressing the output side of said light valve and thereby providing a coherent output of said plurality of images from said valve to said Fourier transform lens, and means for imaging said plurality of images for viewing, said means for imaging including first and second orthogonally polarized masks disposed in a plane adjacent the Fourier transform lens.

4. Apparatus for displaying of encoded stereoscopic video images comprising: a television monitor for imaging a plurality of images sequentially from a video input, said plurality of images being input video signals that are multiplexed so that adjacent television frames are images of a common source taken from different angles, a light valve having an input and an output, the input of said light valve being disposed for receiving said images from said monitor, a Fourier transform lens, a beam splitter between the output of said valve and said Fourier transform lens for directing coherent images from said valve to said lens, a spatially coherent light source for directing collimated light to said beam splitter for addressing the output side of said light valve and thereby providing a coherent output of said plurality of images from said valve to said Fourier transform lens, means for imaging said plurality of images for viewing and wherein said means for imaging comprises a mask, an imaging lens and a screen disposed in coaxial order for receiving the coherent output of said Fourier transform lens, said mask being disposed at a predetermined plane adjacent the transform lens to polarize selected first and second images of the beam in directions orthogonal to each other, the imaging lens reimaging the input scenes in orthogonal polarization onto the screen for viewing.

5. Apparatus for displaying of encoded stereoscopic video images as set forth in claim 4 wherein said light valve is a liquid crystal light valve, and further comprising a lens between the monitor and the input of said light valve for transfering images from the monitor to the valve.

6. Apparatus for displaying of encoded stereoscopic video images as set forth in claim 6 and further comprising a linear polarizer disposed between said coherent light source and said beam splitter, and a polarization analyzer disposed between said beam splitter and said Fourier transform lens.

* * * * *